United States Patent [19]

Suga

[11] Patent Number: 4,531,433
[45] Date of Patent: Jul. 30, 1985

[54] HYDRAULICALLY CONTROLLED AUTOMATIC TRANSMISSION

[75] Inventor: Masaaki Suga, Yokohama, Japan

[73] Assignee: Nissan Motor Co., Ltd., Yokohama, Japan

[21] Appl. No.: 583,298

[22] PCT Filed: Nov. 29, 1980

[86] PCT No.: PCT/JP80/00292
§ 371 Date: Jul. 28, 1981
§ 102(e) Date: Jul. 28, 1981

[87] PCT Pub. No.: WO81/01597
PCT Pub. Date: Jun. 11, 1981

Related U.S. Application Data

[63] Continuation of Ser. No. 287,717, filed as PCT JP 80/00292 Nov. 29, 1980, published as WO 81/01597 Jun. 11, 1981, § 102(e) date Jul. 28, 1981.

[30] Foreign Application Priority Data

Nov. 29, 1979 [JP] Japan ................. 54-153545
Mar. 12, 1980 [JP] Japan ................. 55-30227

[51] Int. Cl.³ .................. B60K 41/16; B60K 41/18
[52] U.S. Cl. .................. 74/869; 192/3.31; 192/3.58; 74/752 A; 74/866
[58] Field of Search ............. 74/866, 867, 868, 869, 74/752 A; 192/3.31, 3.58, 103 R; 137/554; 200/82 E, 82 R

[56] References Cited

U.S. PATENT DOCUMENTS

| | | | |
|---|---|---|---|
| 3,002,063 | 9/1961 | Giladett | 200/82 R |
| 3,621,167 | 11/1971 | Burke | 200/82 R |
| 3,871,250 | 3/1975 | Miyanchi et al. | 74/869 |
| 3,960,124 | 6/1976 | Payne | 137/554 |
| 4,041,809 | 8/1977 | Dick et al. | 74/866 |
| 4,086,456 | 4/1978 | Boue | 200/82 R |
| 4,213,021 | 7/1980 | Alexander | 200/82 E |
| 4,232,699 | 11/1980 | Hsu | 137/554 |
| 4,243,856 | 1/1981 | Gratzmuller | 200/82 E |
| 4,274,308 | 6/1981 | Iwanaga et al. | 74/869 |

FOREIGN PATENT DOCUMENTS

| | | |
|---|---|---|
| 2009985 | 9/1971 | Fed. Rep. of Germany . |
| 2353306 | 5/1974 | Fed. Rep. of Germany . |
| 2449196 | 4/1976 | Fed. Rep. of Germany . |
| 50-19814 | 7/1975 | Japan . |
| 53-83978 | 7/1978 | Japan . |

Primary Examiner—George H. Krizmanich
Assistant Examiner—Dirk Wright
Attorney, Agent, or Firm—Schwartz, Jeffery, Schwaab, Mack, Blumenthal & Evans

[57] ABSTRACT

A hydraulic control type automatic transmission includes at least one shift valve (131, 132) which operates in accordance with a predetermined relation between the vehicle speed and the engine load to selectively supply hydraulic pressure to a plurality of friction elements (104, 105, 106, 107) to engage and disengage the friction elements. The automatic transmission further includes shift valve operation detecting switches (41, 42, 43, 44; 46, 47, 48; 229, 230) each of which are directly responsive to the displacement of a spool (160, 164) of the shift valve and produces electric output signal representing the operating condition of the shift valve just before the actual engagement or disengagement of the friction element or elements. The signal may, for example, be used to release a direct clutch (5) during the shifting operation.

Preferably, each switch includes a fixed contact formed by a U-shaped plate spring (229, 230) which is mounted on an end wall (40) of the shift valve and is opposed to the spool which acts as a movable contact, and the fixed contact is kept in contact with or spaced from the spool until the pressure receiving area of the spool is abruptly changed when the spool displaces between both end positions.

4 Claims, 15 Drawing Figures

FIG_6
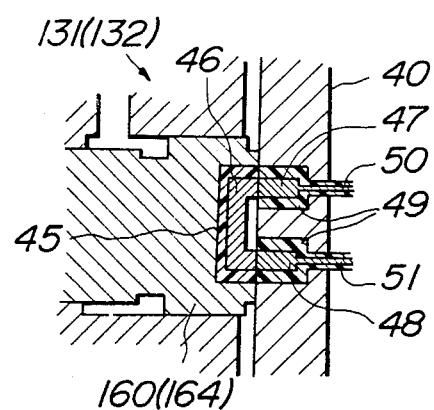
FIG_7
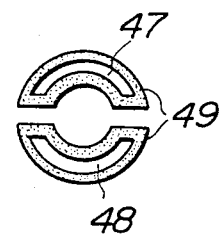

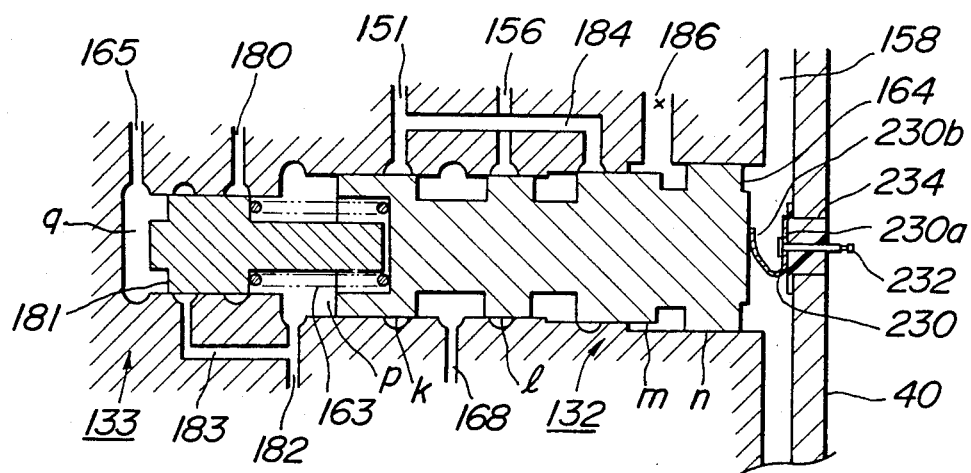
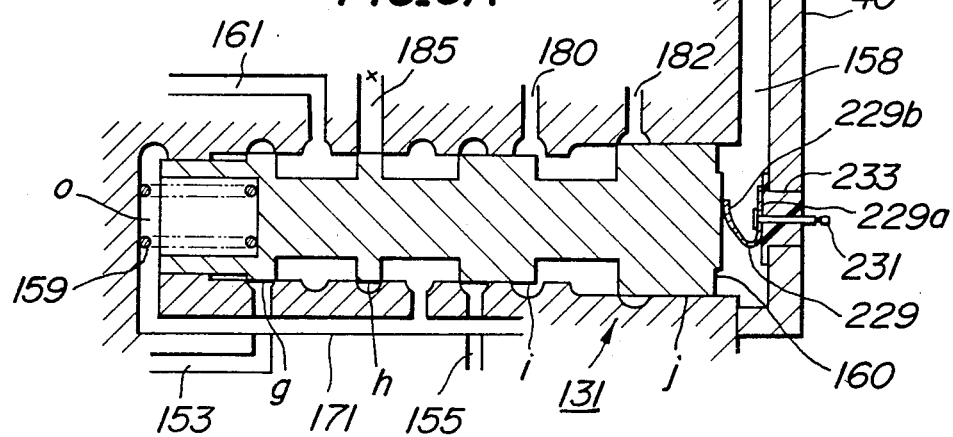

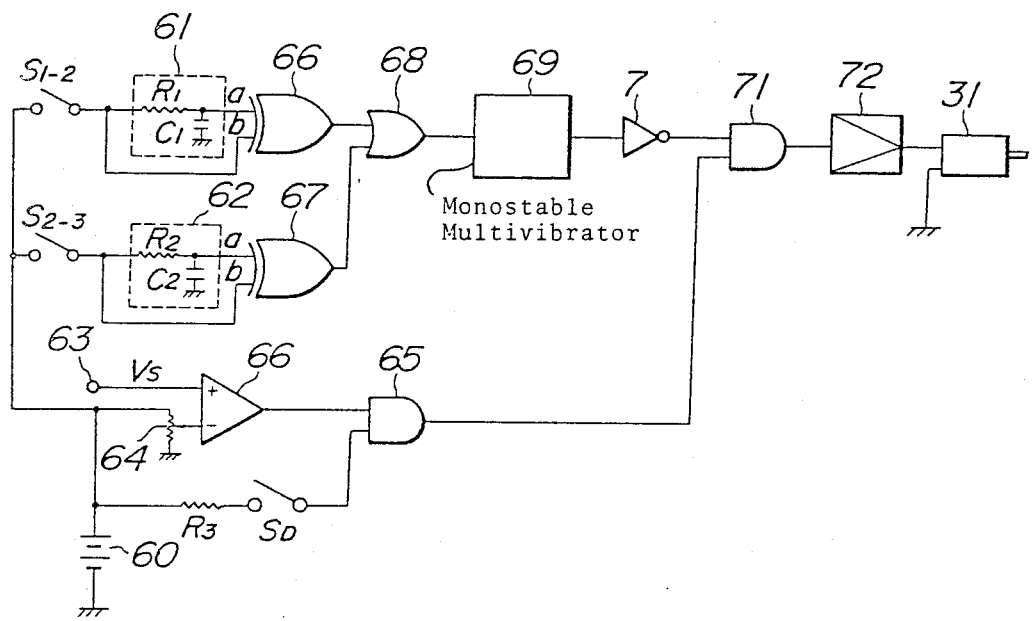
FIG_11
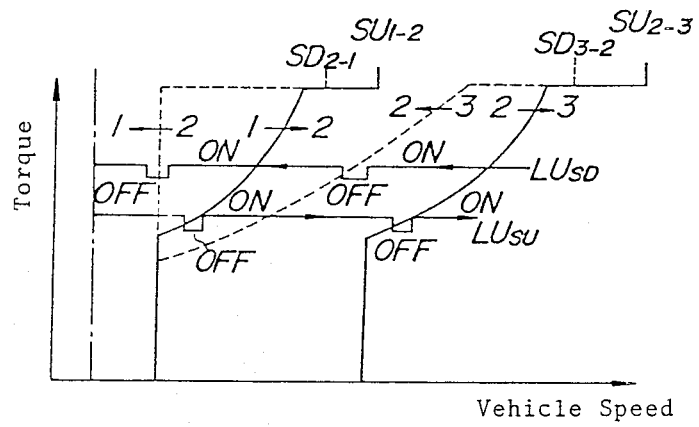
FIG_12

HYDRAULICALLY CONTROLLED AUTOMATIC TRANSMISSION

This application is a continuation of application Ser. No. 287,717, filed July 28, 1981.

TECHNICAL FIELD

The present invention relates to an automatic transmission which is capable of effecting an automatic speed change in accordance with a predetermined shift pattern by actuating shift valves by means of hydraulic pressure representing the vehicle speed and of hydraulic pressure representing the engine load.

BACKGROUND ART

Vehicle having automatic transmission may include auxiliary devices which should be controlled at the time of shifting or corresponding to shift positions, e.g. direct clutch lock-up device, ignition advance device, exhaust processing device and the like. In this case, the automatic transmission must include a shift position detector. Conventionally, such a shift position detector is known, which includes a hydraulic pressure switch operated by detecting working hydraulic pressure which is delivered to friction elements for selecting each shift position of the automatic transmission, e.g. rear clutch, front clutch, band brakes and the like, wherein shifting is detected by ON or OFF of the pressure switch. However, the working hydraulic pressure to actuate the friction elements is not applied at the same instant with the actuation of the shift valve, and is applied with some time lag from the actuation of the shift valve due to delayed response of hydraulic system. Thus, conventional shift detector can not detect the shifting at the actual instant thereof when the shift valve is actuated, and accompanies some actuation delay. Also such a shift detector requires a design modification to add a hydraulic circuit for operating the pressure switch to a hydraulic system of shift control apparatus of automatic transmission. Besides, the pressure switch itself is relatively expensive. Consequently, manufacturing cost of such a shift detector inevitably increases.

DISCLOSURE OF THE INVENTION

Accordingly, an object of the present invention is to provide an automatic transmission including an improved shift detecting apparatus which can detect shift positions without accompanying actuation delay, which does not require design modification the hydraulic control system of the shift controlling apparatus, and which is simple in construction and can be produced economically.

The automatic transmission according to the present invention includes at least one shift valve having a spool which is applied with the hydraulic pressure representing the vehicle speed and, in opposite relation thereto, with the hydraulic pressure representing the engine load, said shift valve being operated in accordance with a predetermined relation between the vehicle speed and the engine load to selectively supply hydraulic pressure to a plurality of friction elements to cause engagement and disengagement of said friction elements selectively, and is characterized by shift valve operation detecting switch means which is directly responsive to the displacement of said spool between one end position and the other end position of the spool to detect said displacement to thereby produce electric output signal representing the operation of the shift valve.

Thus, according to the present invention, shift signal can be detected simultaneously with the operation of the shift valve, i.e. before the actual operation of the friction element(s) so that the detected signal may be utilized to control a lock-up apparatus of a direct drive clutch. By this measure, it is possible to realize normal lock-up condition all through first to third speeds of a forward automatic shifting position (D range), and the lock-up is released only during the actual shifting operation. By this, acceleration and deceleration characteristics and fuel consumption can be substantially improved when compared with a conventional automatic transmission without the lock-up apparatus, or with an automatic transmission which performs the lock-up only at the third speed range.

BRIEF DESCRIPTION OF THE DRAWING

FIG. 6 is a sectional view showing the shift valve actuation detecting means according to another embodiment of the present invention;

FIG. 7 is a front view showing a fixed terminal thereof;

FIGS. 9A and 9B are sectional views of the 1-2 shift valve and the 2-3 shift valve in the shift starting condition respectively;

FIG. 11 is a circuit diagram of a lock-up solenoid control circuit according to one embodiment of the present invention; and FIG. 12 is a diagram showing the relation between the shift curves and the actuation of the lock-up solenoid.

BEST MODE OF CARRYING OUT THE INVENTION

Figure 1:
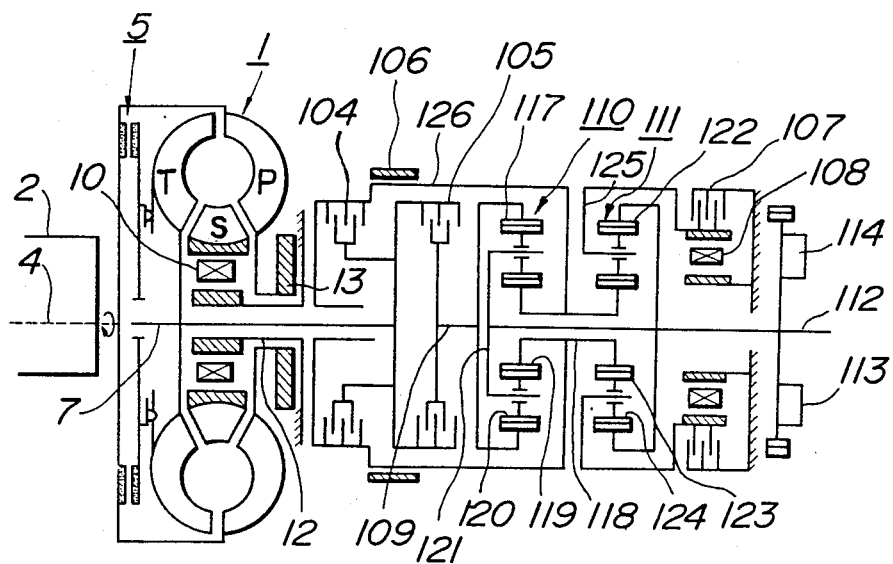
FIG. 1 is a schematic illustration showing the construction of a power transmission mechanism for an automatic transmission with a torque converter, to which the present invention is applied.

Referring now to the drawings, the hydraulically controlled automatic transmission to which the present invention is applied comprises a lock-up torque converter. FIG. 1 shows diagrammatically a power transmission mechanism with three forward and one backward speeds of the automatic transmission. The mechanism include a crankshaft 4 driven by an engine 2, a torque converter 1 with a direct drive clutch 5 which will be explained later, an input shaft 7, a front clutch 104, a rear clutch 105, a second brake 106, a low-andreverse brake 107, an one-way brake 108, an intermediate shaft 109, a first planetary gear unit 110, a secondary planetary gear unit 111, an output shaft 112, a first governor valve 113, a second governor valve 114 and an oil pump 13.

The torque converter 1 comprises a pump wheel P, a turbine wheel T and a stator wheel S. The pump wheel P is driven by the crankshaft 4 to drive working liquid in the torque converter, and to deliver torque to the turbine wheel T which is fixedly secured to the input shaft 7. The torque is transmitted by the input shaft 7 to the transmission gear train. The stator wheel S is mounted on a sleeve 12 through a one-way clutch 10. The one-way clutch 10 allows the rotation of the stator wheel S in the same direction as the crankshaft 4 shown by arrow (called as rotation in the positive direction, hereinafter) and prohibits the rotation in the opposite direction (called as rotation in the reverse direction, hereinafter).

The first planetary gear unit 110 includes an internal gear 117 which is secured to the intermediate shaft 109, a sun gear 119 which is secured to a hollow transmission shaft 118, planet gears 120 consisting of two or more pinions which mesh with the internal gear 117 and the sun gear 119 and rotate and revolve simultaneously, and a planet carrier 121 which is secured to the output shaft 112 and rotatably supports the planet gears 120. The secondary planetary gear unit 111 includes an internal gear 122 which is secured to the output shaft 112, a sun gear 123 which is secured to the hollow transmission shaft 118, planet gears 124 consisting of two or more pinions which mesh with the internal gear 122 and the sun gear 123 and rotate and revolve simultaneously, and a planet carrier 125 which rotatably supports the planet gear 124.

The front clutch 104 connects in operation the input shaft 7 driven by the turbine wheel T, through a drum 126, with the hollow transmission shaft 118 which rotates integrally with the both sun gears 119 and 123. The rear clutch 105 connects in operation the input shaft 7 through the intermediate shaft 109 with the internal gear 117 of the first planetary gear unit 110.

The second brake 106 has a band which is wound about and tightens in operation the drum 126 secured to the hollow transmission shaft 118 to fix the sun gears 119 and 123. The low and reverse brake 107 fixes in operation the planet carrier 125 of the second planetary gear unit 111. The one-way brake 108 allows the rotation of the planet carrier 125 in the positive direction but not in the reverse direction.

The first governor valve 113 and the second governor valve 114 are secured to the output shaft 112 and produce the governor pressure corresponding to the vehicle speed.

Now, the operation of the power transmission train will be described in case a select lever, not shown, is set into D position (forward automatic shifting position).

In this case, at first, the rear clutch 105 which is a forward input clutch is engaged. Power supplied from the engine through the torque converter is transmitted from the input shaft 7 through the rear clutch 105 to the internal gear 117 of the first planetary unit 110. Thus, the internal gear 117 drives the planet gears 120 in the positive direction. Thus, the sun gear 119 rotates in the reverse direction so that the sun gear 123 of the second planetary gear unit 23 integral with the sun gear 119 also rotates in the reverse direction to effect rotation in the positive direction of the planet gears 124 of the second planetary gear unit 111. The one-way brake 108 prevents the planet carrier 125 from rotating in the reverse direction by the sun gear 123 and acts as a forward reaction brake. Consequently, the internal gear 122 of the second planetary gear unit 111 rotates in the positive direction. Accordingly, the output shaft 112 which rotates integrally with the internal gear 122 rotates in the positive direction to obtain the reduction ratio of the forward first speed.

When the vehicle speed increases further and the second brake 106 is engaged, power applied through the input shaft 7 and the rear clutch 105 is transmitted to the internal gear 117. The second brake 106 fixes the drum 126 and prevents the sun gear 119 from rotation, so that it acts as a forward reaction brake. Thus, the planet gears 120 rotate and revolve about the stationary sun gear 119. Consequently, the planet carrier 121 and the output shaft 112 which is integral with the planet carrier 121 rotate in the positive direction at a reduced speed which is faster than the first speed, so that the reduction ratio of the forward second speed is obtained.

When the vehicle speed increases further and the second brake 106 is released while the front clutch 104 is engaged, power applied to the input shaft 7 is transmitted through the rear clutch 105 to the internal gear 117 on one hand, and through the front clutch 104 to the sun gear 119 on the other hand. Thus, the internal gear 117 and the sun gear 119 are interlocked and rotate with the planet carrier 121 and with the output shaft 112 in the positive direction at the same speed, so that the forward third speed is obtained. In this case, the front clutch 104 and the rear clutch 105 act as input clutch means. As no torque increase by planetary gear unit is performed, there is no reaction brake.

Now, the operation of the power transmission train will be described in case the manual select lever is set into R position (backward driving position).

In this case, the front clutch 104 and the low-and-reverse brake 107 are engaged. Power supplied from the engine through the torque converter is transmitted from the input shaft 7 through the front clutch 104 and the drum 126 to the sun gears 119 and 123. As the planet carrier 125 is fixed by the low-and-reverse brake 107, rotation of the sun gears 119 and 123 in the positive direction is transmitted to the internal gear 122 in a reduced speed and in the reverse direction. Thus the output shaft 112 which is integral with the internal gear 122 also rotates in the reverse direction to obtain the reduction ratio of the backward drive.

Figure 2:
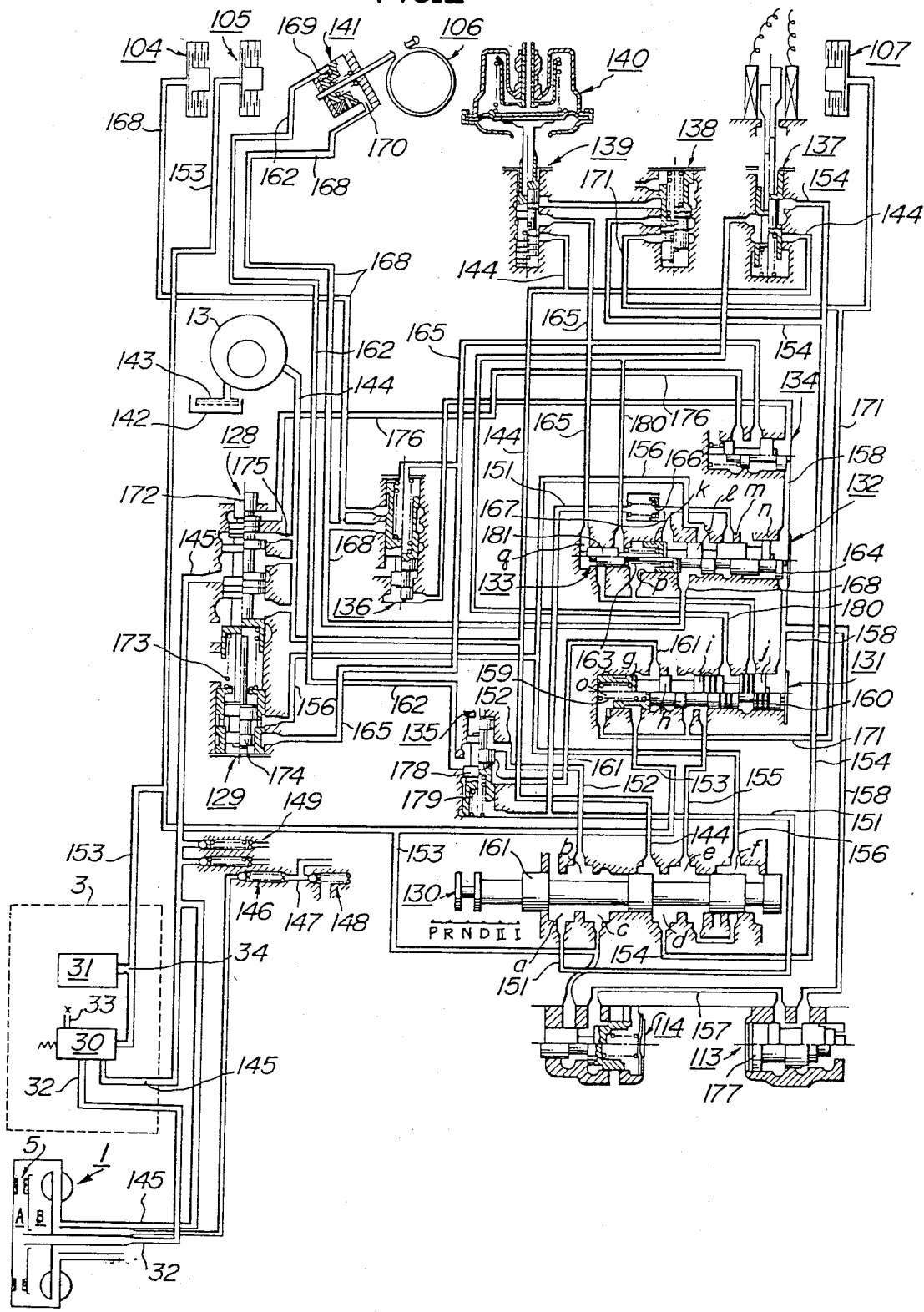
FIG. 2 is hydraulic circuit diagram of a shift control apparatus to control the transmission mechanism.

FIG. 2 shows a hydraulic circuit system of the shift control apparatus of the automatic transmission, which system includes the oil pump 13, a line pressure regulator valve 128, a booster valve 129, the torque converter 1, a manual valve 130, the first governor valve 113, the second governor valve 114, a 1-2 shift valve 131, a 2-3 shift valve 132, a throttle modulator valve 133, a cut-down valve 134, a second lock valve 135, a 2-3 timing valve 136, a solenoid downshift valve 137, a throttle back-up valve 138, a vacuum throttle valve 139, a vacuum diaphragm 140, the front clutch 104, the rear clutch 105, the second brake 106, a servo 141, the low-and-reverse brake 107 and hydraulic circuit network.

The oil pump 13 is driven by the engine 2 through the crankshaft 4 and the pump wheel P of the torque converter 1 as shown in FIG. 1, and sucks oil from a reservoir 142 through a strainer 143 which removes harmful particles, and delivers pressurized oil to a line pressure passage 144 constantly when the engine is operated.

Pressurized oil delivered from the oil pump 13 is regulated by the line pressure regulator valve 128 to a predetermined pressure, and is applied to the torque converter 1 and the manual valve 130 as operating hydraulic oil. The line pressure regulator valve includes a spool 172 and a spring 173. In addition to the force of the spring 173, the throttle pressure through a passage 165 and the line pressure through a passage 156 are applied through a spool 174 of the booster valve to a lower surface of the spool 172, which are in balance with the line pressure through the passage 144 and an orifice 175 and with the pressure through a passage 176.

Operating hydraulic oil of the torque converter 1 is introduced into a passage 145 from the passage 144 through the line pressure regulator valve 128, and is kept below a predetermined pressure by a relief valve 146. When the pressure in the torque converter 1 exceeds the predetermined value, the relief valve 146 is opened and an excessive oil is supplied through a passage 147 to rear lubricating elements of the power transmission mechanism. When the lubricating oil pressure is too high, a relief valve 148 is opened to decreae the pressure. Front lubricating elements of the power transmission mechanism is lubricated from the passage 145 through a front lubricating valve unit 149.

The manual select valve 130 is a manually operated fluid direction change-over valve and includes a spool 150 which is connected through linkage means, not shown, with the select lever. By a speed selecting operation of the lever, the spool 150 is moved to change-over pressurized passages for the line pressure, i.e. passages which are connected with the line pressure passage 144. In the position illustrated in FIG. 2, the spool 150 is in N (neutral) position and the line pressure passage 144 is opened to ports d and e.

The first governor valve 113 and the second governor valve 114 produce governor pressure during the forward driving, which operates the 1-2 shift valve 131 and 2-3 shift valve 132 to effect an automatic shifting, and which also controls the line pressure. When the manual valve 130 is at D position, II position (i.e. forward and fixed second speed position) or I position (i.e. forward and fixed first speed position), the oil pressure from the line pressure passage 144 passes through a port c of the manual valve 130 to the second governor valve 114, and when the vehicle is running, the governor pressure modulated in the second governor valve 114 is supplied through a passage 157 into the first governor valve 113. When the vehicle speed reaches a predetermined value, a spool 177 of the first governor valve 113 is displaced to communicate the passage 157 with a passage 158 to produce the governor pressure in the passage 158 which communicates with right end surfaces of the 1-2 shift valve 131, 2-3 shift valve 132 and the cut-down valve 134, which is then kept in equilibrium with spring forces which urges the valves rightwards, respectively.

From the port c of the manual valve, a hydraulic circuit extends through a passages 153, 161 and 162 to an apply chamber 169 of the servo 141 which tightens the second brake 106, in which circuit the 1-2 shift valve and the second lock valve 135 are arranged separately. From a port b of the manual valve 130, a passage 152 extends to the second lock valve 135.

The 1-2 shift valve 131 performs an automatic shifting between the first and the second speeds, and has a valve spool 160 which is urged leftwards in FIG. 2 by the governor pressure through the passage 158. The governor pressure is opposed by a spring 159 which is enclosed in a left end chamber q and engages with the left end surface of the spool 160. The 2-3 shift valve 132 performs an automatic shifting between the second and third speeds, and has a valve spool 164 which is urged leftwards in FIG. 2 also by the governor pressure through the passage 158. The governor pressure is opposed by a spring 163 which is enclosed in a left end chamber p and engages with the left end surface of the valve spool 164 as shown in FIG. 2. The left end of the spring 163 engages with a right end surface of a valve spool 181 of the throttle modulator valve 133. The left end of the valve spool 181 is urged by the throttle pressure in the chamber q which is supplied through the passage 165. The throttle pressure corresponds to the throttle opening (engine suction negative pressure) which represents the engine load. The throttle pressure is modulated by the throttle modulator valve 133 to a modulated throttle pressure which is suitable to control the shifting, and is supplied to a passage 182 in the manner described below.

Namely, a passage 180 extends between the throttle modulator valve 133 and the solenoid downshift valve 137 which is in communication with drain passage during the normal driving other than kick-down (full throttle) operation. Through the passage 180, a portion of oil in the chamber p is drained off, or the chamber p is supplied with the throttle pressure in the chamber q through a passage 183, so that the valve spool 181 is maintained in the illustrated equilibrium position. By this, there is produced a modulated throttle pressure in the chamber p and hence in the passage 182 connected therewith, which is lower than the throttle pressure by a predetermined amount. During the kickdown operation, the solenoid downshift valve 137 supplies kickdown signal (line pressure) through the passage 180 so that the valve spool 181 of the throttle modulator valve 133 is urged to left end position. Thus, the kickdown signal is also supplied to the chamber p and passage 182.

In the above-mentioned hydraulic circuit system, when the spool 150 of the manual valve 130 is set to the D position, the line pressure passage 144 communicates with the ports a, b and c. A portion of the line pressure through the port a to the passage 151 is applied to the lower end of the second lock valve 135 so that a spool 178 thereof maintained in its upward position by the oil pressure and a spring 179 is prevented from displacing downwardly by the oil pressure applied through the port b and the passage 152. Thus, communication between the passages 161 and 162 is maintained. Other portion of the line pressure through the port a of the valve 130 passes through an orifice 166 and a passage 167 to the 2-3 shift valve 132. Line pressure from the port c passes through the passage 153 to the second governor valve 114, rear clutch 105 and the 1-2 shift valve 131, respectively.

When the vehicle is stopped, the governor pressure through the passage 158 is zero, so that the valve spool 160 of the 1-2 shift valve 131 is urged to right end position by the spring 159. Thus, the passage 153 supplied with the line pressure from the manual valve 130 is blocked by a land g of the valve spool 160 from the passage 161 which extends to the servo apply chamber 169 of the band brake 106.

Similarly, when the vehicle is stopped, the valve spool 164 of the 2-3 shift valve 132 is maintained to right end position shown in FIG. 2, by the urging force, e.g. of the spring 163. Thus, the passage 151 supplied with the line pressure from the manual valve 130 is blocked by a land k of the valve spool 164 from the passage 168 which extends to a servo release chamber 170 of the second brake 106 and to the front clutch 104. Consequently, the rear clutch 105 only is engaged in the automatic transmission so that starting of the vehicle is performed in the forward first speed.

After the vehicle is started and the vehicle speed exceeds a predetermined value, the governor pressure through the passage 158 urges the valve spool 160 of the 1-2 shift valve 131 leftwards to block the passage 153 by the land g. As the line pressure applied to the land g becomes zero in tis condition, rightward urging force is decreased suddenly so that the valve spool 160 reaches the left end position instantaneously by this snap action. Thus, the line pressure in the passage 153 is passed through the passage 161 to the servo apply chamber 169 of the band brake 106 so that an upshifting of the automatic transmission takes place from the first speed to the second speed.

At a high load operating condition of the engine in which acceleration pedal is depressed deeply (but not as much as effecting the kickdown), the line pressure and the modulated throttle pressure are increased correspondingly to urge the valve spool 160 rightwards. Thus, a higher governor pressure becomes necessary to move the spool 160 leftwards. This means that the shift point displaces to a higher vehicle speed side as the engine load increases.

While the vehicle is driving at the second speed, when the vehicle speed increases beyond a predetermined value, the governor pressure in the passage 158 urges leftwards the valve spool 164 of the 2-3 shift valve 132 to block the passage 151 by a land m, so that the rightward urging force applied to the left end surface of the land m decreases to zero. Thus, the rightward urging force of the hydraulic pressure decreases suddenly corresponding to the differential area between the lands l and m. The valve spool 164 moves to the left end position by the snap action. In this instance, the line pressure in the passage 151 is supplied through the passage 168 to the servo release chamber 170 of the band brake 106 and also to the front clutch 104. The second brake 106 is released and the front clutch 104 is tightened. Thus, an upshifting of the automatic transmission takes place from the second speed to the third speed.

At a high load operating condition of the engine, in which the acceleration pedal is depressed deeply (but not as much as effecting the kickdown), the line pressure and the modulated throttle pressure are increased correspondingly, so that a higher governor pressure becomes necessary to urge the valve spool 164 of the 2-3 shift valve 132. Thus, the 2-3 shift point displaces to a higher vehicle speed side as the engine load is increased.

Conversely, while the vehicle is driving at the second speed in the D-position, when the vehicle speed decreases below a predetermined value, the governor pressure in the passage 158 is decreased so that the valve spool 160 of the 1-2 shift valve 131 moves rightwards from the left end position. As the land g of the valve spool 160 opens the passage 153, the line pressure in the passage 153 acts on the left end surface of the land g so that the spool 160 moves instantaneously to the right end position shown in FIG. 2 by a snap action. Thus, as described before, the passage 161 which extends to the servo apply chamber 169 of the second brake 106 is blocked from the line pressure passage 153 and communicates with the drain passage 185. Consequently, the second brake 106 is released, and the downshifting of the automatic transmission takes place from the second speed to the first speed, as only the rear clutch 105 is engaged.

While the vehicle is driving at the second speed in the D-position, when the accelerator pedal is depressed to the limit to achieve the kickdown condition, the kickdown signal (the line pressure) from the solenoid downshift valve 137 is applied through the passage 180 to a chamber between lands i and j of the valve spool 160 of the 1-2 shift valve 131, so that rightward urging froce produced by the differential area between the lands i and j displaces the valve spool forcibly from the left end position to the right end position shown in FIG. 2. Thus, a forced downshifting of the automatic transmission is effected from the second speed to the first speed to enable a fast acceleration of the vehicle. When the vehicle speed is increased beyond a predetermined value, the governor pressure through the passage 158 urges the valve spool 160 leftwards. Thus, an upshifting of the automatic transmission is effected from the first speed to the second speed, even in the kickdown condition.

While the vehicle is driving at the third speed in the D-position, when the vehicle speed is decreased below a predetermined value, the governor pressure through the passage 158 is decreased to displace the valve spool 164 of the 2-3 shift valve 132 rightwards from the left end position shown in FIG. 2. As the land m of the valve spool 164 opens the passage 184, the line pressure is applied into the chamber between the lands l and m, so that the rightward urging force produced by the differential area between the lands l and m displaces the valve spool 164 instantaneously to the right end position by a snap action. Thus, the passage 168 which extends to the servo release chamber 170 and to the front clutch 104 is blocked from the line pressure passage 151 and communicates with the passage 156 which is now drained by the manual valve 130. Consequently, the front cutch 104 is released and the second brake 106 is tightened or becomes operative again. Thus, a downshifting of the automatic transmission is effected from the third speed to the second speed, as the rear clutch 105 and the second brake 106 are engaged.

The chamber between the lands m and n of the valve spool 164 of the 2-3 shift valve 132 normally communicates with the drain passage 186 so that the chamber does not disturb the displacement of the valve spool 164 or the above-mentioned function of the 2-3 shift valve.

While the vehicle is driving at the third speed, when the acceleration pedal is depressed to the limit position to achieve the kickdown condition, the kickdown signal (line pressure) in the passage 180, produced by the solenoid downshift valve 137 as explained hereinbefore, is applied to the chamber p and forcibly displaces the valve spool 164 to the right end position in FIG. 2. Also, the kickdown signal displaces the valve spool 181 of the throttle modulator valve 133 to the left end position. As the valve spool 164 is displaced, a forced downshifting of the automatic transmission is effected from the third speed to the second speed, and a fast acceleration of the vehicle is performed. When the vehicle speed is increased beyond a predetermined value, the governor pressure in the passage 158 displaces the valve spool 164 leftwards so that an upshifting of the automatic transmission is effected from the second speed to the third speed, even in the kickdown condition. When the valve spool 181 of the throttle modulator valve 133 is displaced to the left end position, the kickdown signal in the passage 180 passes through the chamber p and the passage 182 to a chamber between the lands i and j of the valve spool 160 of the 1-2 shift valve 131. Thus, the above-mentioned shifting in the kickdown condition is effected as the valve spool 160 is applied with the kickdown signal even when the spool is in the right end position in FIG. 2 to block the passage 180.

When the spool 150 of the manual valve 130 is set to the II position (i.e. the forward second speed locked position), the line pressure passage 144 communicates with the ports b, c and d. As in the D position, the hydraulic pressure through the ports b and c engages the rear clutch 105. As to the second lock valve 135, the lower side of the valve 135 is drained through the port a of the manual valve 130 and the hydraulic pressure through the passage 152 acts between an upper smaller land and a lower larger land of the spool 178 of the valve 135 so that the spool 178 of the second lock valve 135 is urged downwards against the spring 179. Thus, the passages 152 and 162 are communicated with each other, to supply hydraulic pressure to the servo apply chamber 169 of the servo 141. Consequently, the second brake 106 is engaged and the automatic transmission is driven in the forward second speed.

Further, the hydraulic pressure from the port d of the manual valve 130 passes through the passage 154 to the solenoid downshift valve 137 and to the throttle back-up valve 138. The port a of the manual valve 130 is drained so that the passage 151 does not supply the hydraulic pressure to the 2-3 shift valve 132. By this, the second brake 106 is not released and the front clutch 104 is not engaged, so that the transmission is not shifted into the forward third speed range. The second lock valve 135 and the manual valve 130 cooperate to lock the transmission in the forward second speed.

When the manual valve 130 is set to the I position (i.e. forward first speed locked position), the line pressure passage 144 communicates with the ports c, d and e. Hydraulic pressure through the ports c and d acts as in the above-mentioned II position and engages the rear clutch 105. Hydraulic pressure through the port e passes through the passage 155, 1-2 shift valve 131 and passage 171 to the low-and-reverse brake 107 and engages the same as the forward reaction brake to effect shifting of the transmission into the forward first speed range. Hydraulic pressure through the passage 171 is also supplied to the left end surface of the 1-2 shift valve 131 to urge the spool 160 to the right end position together with the spring 159, so that the forward first speed is locked.

When the manual valve 130 is set to the R position (rearward drive position), the line pressure passage 144 communicates with the ports d, e, and f by the spool 150. Hydraulic pressure through the port e passes through the passages 155 and 171 to engage the low-and-reverse brake 107. Hydraulic pressure through the port f passes through the passage 156, 2-3 shift valve 132 and passage 168 to the release chamber 170 of the servo 141 to maintain the second brake 106 in the released condition and also to engage the front clutch 104. Thus the transmission is driven in the rearward drive condition.

Table I shows the relation between each of the above-mentioned set positions of the manual valve and the shift conditions of the transmission, and the operation of related portions. In the Table 1, "0" shows engagement of related clutch or brake.

TABLE 1

| Select lever | Clutch Front | Clutch Rear | Low-and-reverse brake | Second brake Engage | Second brake Release | One-way clutch |
|---|---|---|---|---|---|---|
| P |  |  | 0 |  |  |  |
| R | 0 |  | 0 |  | 0 |  |
| N |  |  |  |  |  |  |
| D 1 |  | 0 |  |  |  | 0 |
| 2 |  | 0 |  | 0 |  |  |
| 3 | 0 | 0 |  |  | 0 |  |
| II |  | 0 |  | 0 |  |  |
| I 2 |  | 0 |  | 0 |  |  |
| 1 |  | 0 | 0 |  |  |  |

Figure 3:
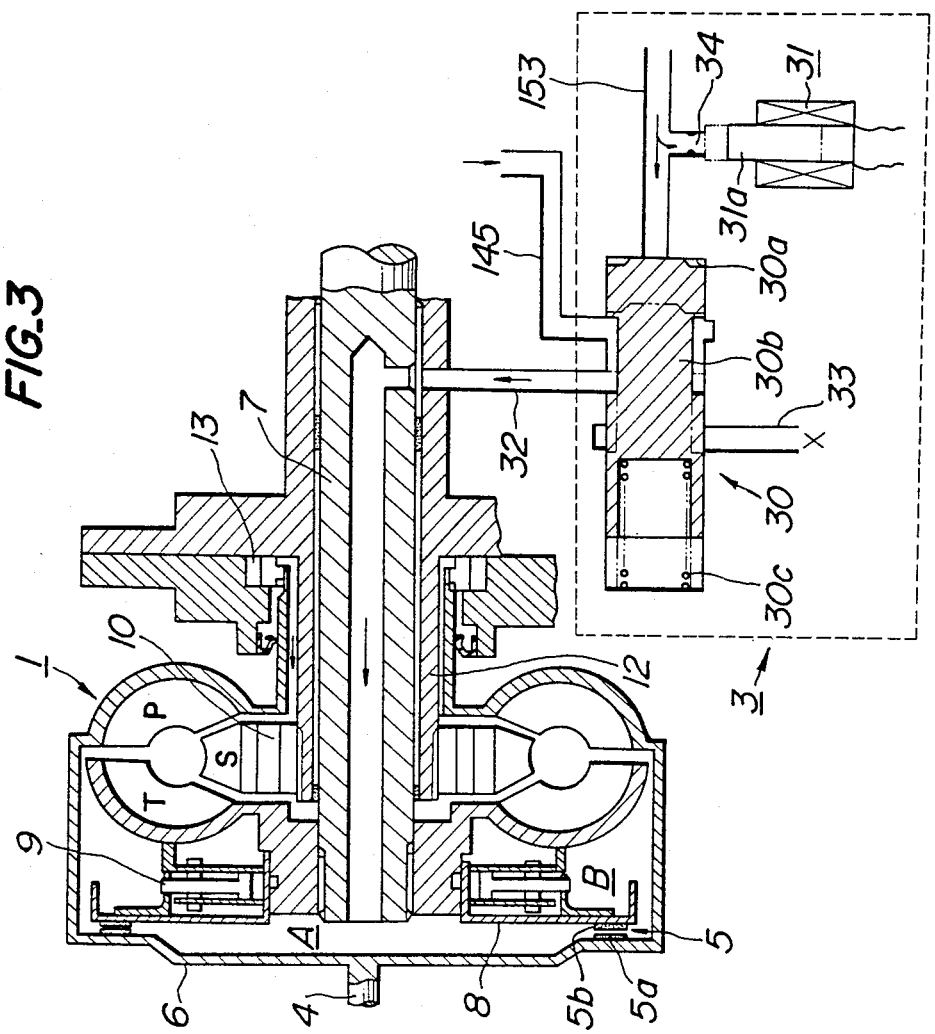
FIG. 3 is an enlarged sectional view showing the detail of a lock-up device.

Hydraulic circuit 3 to control the direct drive clutch 5 is shown in FIG. 2 enclosed by broken line, and comprises a direct drive clutch control valve (lock-up valve) 30 and a lock-up solenoid 31 which are shown in FIG. 3 in detail.

The lock up valve 30 has a hydraulic chamber 30a, a spool 30b which slides in the hydraulic chamber 30a and switches application of hydraulic pressure to the direct clutch 5, and a spring 30c which urges the spool 30b rightwards shown in FIG. 3. The hydraulic chamber 30a is connected with the passage 153 which suppies the working pressure of the spool 30b, with the passage 145 which passes the torque converter pressure, with a passage 32 extending through the input shaft 7 to a chamber A of the direct clutch 5, and with a drain passage 33.

An orifice 34 normally releases the rear clutch actuating pressure through the passage 153, and is opened or closed by the lock-up solenoid 31 so that the lock-up valve 30 disengages or engages the direct clutch 5.

More particularly, when the lock-up solenoid 31 is not energized (OFF), a plunger 31a is retracted as shown by solid line to open the orifice 34, and the rear clutch actuation pressure in the passage 153 is decreased as being partially drained through the orifice 34. Thus, the spool 30b of the lock-up valve 30 is urged to the right end position by the spring 30c, as shown by solid line in FIG. 3.

In this condition, the torque converter pressure through the passage 145 is applied through the lock-up valve 30, passage 32 and passage in the input shaft 7 to the chamber A of the direct clutch 5. Another chamber B of the direct clutch 5 is also applied with the same torque converter pressure so that the pressure across the chambers A and B is balanced. Thus, clutch facings 5A and 5B of the direct clutch 5 are released from each other to maintain of the direct clutch 5 in the released condition.

Accordingly, the torque converter 1 operates in a normal torque converting condition, and the power is transmitted through the drive plate 6, pump wheel P, hydraulic fluid, not shown and turbine wheel T, to the input shaft 7.

When the lock-up solenoid 31 is energized (ON), the plunger 31a is extended to close the orifice 34, so that the rear clutch actuating pressure through the passage 153 is applied directly to the hydraulic chamber 30a of the lock up valve 30. By this, the spool 30b is moved leftwards against the spring 30c as shown by imaginary line in FIG. 3, and the passage 32 is disconnected from the passage 145 and connected with the passage 33.

As the passage 32 is drained through the passage 33, hydraulic pressure in the chamber A of the direct clutch 5 is decreased so that the torque converter pressure in the chamber B urges a direct clutch piston 8 towards the drive plate 6. Thus, the clutch facings 5A and 5B engage with each other to connect the direct clutch 5. This operating condition is called as lock-up.

In the lock-up condition, the power is transmitted directly through the drive plate 6, direct clutch 5, direct clutch piston 8, torsional damper 9 and turbine wheel T, to the input shaft 7, without being transmitted through the hydraulic fluid. Thus, the rotation of the crankshaft 4 is directly transmitted to the input shaft 7.

Shift valve actuation detecting means which detects the actuation of the shift valve directly and converts the detected information into an electric signal, according to the present invention will be described hereinafter.

Figure 4:
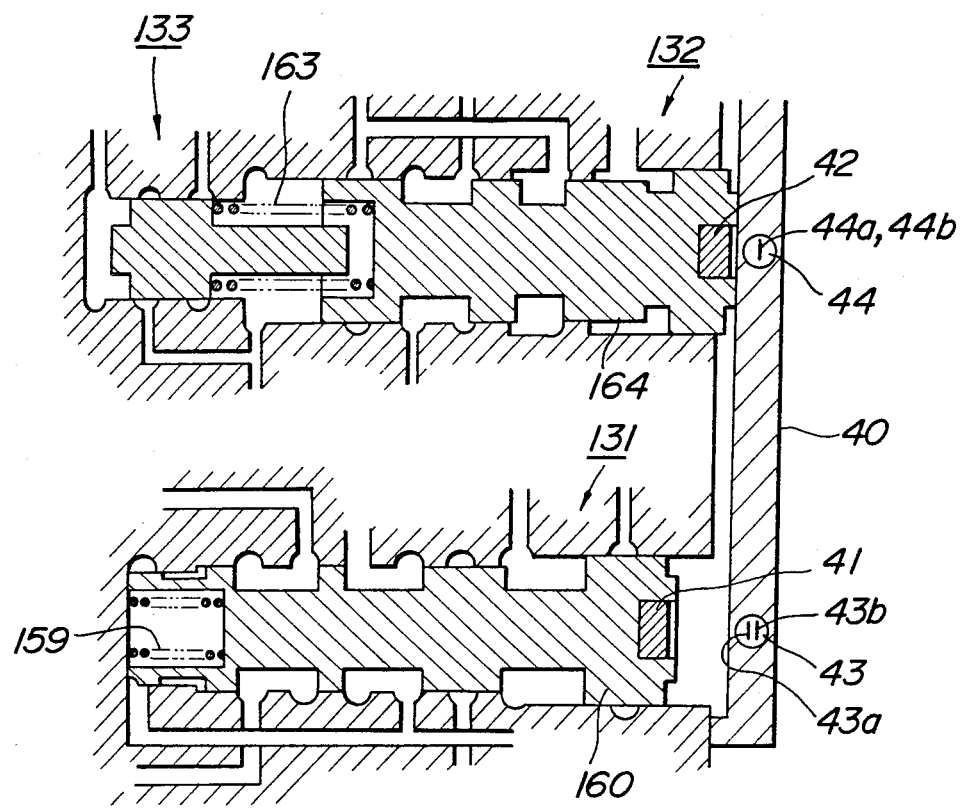
FIG. 4 is a sectional view of shift valve actuation detecting means according to one embodiment of the present invention.

FIG. 4 shows a preferred embodiment of the shift valve actuation detecting means, in which each spool 160 and 164 of the 1-2 shift valve 131 and the 2-3 shift valve 132 is provided with permanent magnets 41 and 42 embedded into end portions thereof which are opposite to a side plate 40. In the side plate 40, lead switches 43 and 44 are embedded each opposing to the magnets 41 and 44. The lead switches 43 and 44 detect the actuation of the shift valves 131 and 132.

Figure 5A:
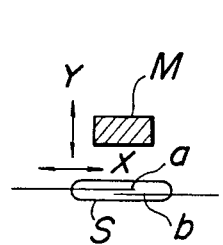
FIGS. 5A and 5B are illustrations showing the arrangement and operation characteristic of magnet and lead switch which are used as the actuation detecting means shown in FIG. 4.
Figure 5B:
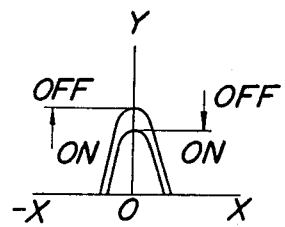

General relation and operation characteristics between a magnet M and a lead switch S are shown in FIGS. 5A and 5B. As shown in FIG. 5A, when the magnet M and the lead switch S are opposed to each other and the magnet M is moved in the direction X or Y as shown by arrows in FIG. 5A, the lead switch S is actuated into ON or OFF with a hysteresis shown in FIG. 5B.

Thus, with such magnets and lead switches, as shown in FIG. 4, when the transmission is driven at the forward first speed range, the spools 160 and 164 of the 1-2 shift valve 131 and the 2-3 shift valve 132 are urged rightwards to engage with the side plate 40, so that the permanent magnets 41 and 42 in the spools 160 and 164 actuats the opposite lead switches 43 and 44 such that lead elements 43a and 43b and lead elements 44a and 44b contact with each other to assume the ON condition.

When the governor pressure is increased to urge the spool 160 of the 1-2 shift valve 131 leftwards, the transmission shifts into the second speed range as described before. As the magnet 41 is separated from the lead switch 43, magnetic force due to the magnet 41 is decreased so that the lead elements 43a and 43b are separated from each other by their own elasticity to switch OFF the lead switch 43. FIG. 4 shows the second speed range.

When the governor pressure is increased further, the spool 164 of the 2-3 shift valve 132 is also urged leftwards, and the transmission shifts into the third speed range. As the permanent magnet 44 is separated from the lead switch 44, the lead switch switches into OFF.

When the vehicle speed is decreased, or the throttle pressure applied to the 1-2 shift valve 131 and the 2-3 shift valve 132 is increased to effect downshifting, the spools 164 and 160 move rightwards so that magnetic force of the permanent magnets 42 and 41 switch the lead switches 43 and 44 into ON.

Table 2 shows the above-mentioned relation between the shift ranges and actuations of lead switches 43 and 44.

TABLE 2

| Lead switch | 1st speed | 2nd speed | 3rd speed |
| --- | --- | --- | --- |
| 43 for 1-2 shift valve | ON | OFF | OFF |
| 44 for 2-3 shift valve | ON | ON | OFF |

As described, when a shift valve is moved to change the hydraulic pressure passage, the hydraulic pressure is applied to the desired one or more friction element to perform shifting only after a delay time determined by the response characteristics of hydraulic system. The shift valve actuation detecting means shown in FIG. 4 detects the movement of each of the shift valves 131 and 132 by the lead switches 43 and 44 as ON/OFF signals thereof. Thus, the shift information can be obtained before the shifting takes place actually.

FIGS. 6 and 7 show another embodiment of the shift valve actuation detecting means. In this embodiment, each of the spools 160 and 164 of the shift valves 131 and 132 is provided with a movable conact 46 embedded therein, which is made of electrically conducting material shaped e.g. into annular shape, and covered by an insulating material 45. The contact 46 is exposed from the end surface of the spool in opposition to the side plate 40. Inside surface of the side plate 40 is provided with two fixed contacts 47 and 48 embedded therein, which are made of electrically conducting material having arcuate end surfaces shown in FIG. 7 and covered by an insulating material 49. The fixed contacts 47 and 48 are opposed to the movable contact 46 and are adapted to be short-circuited by the contact 46. Lead wires 50 and 51 are connected with the contacts 47 and 48, respectively.

When the spool 160 (or 164) of the shift valve 131 (or 132) is urged to the right end to engage with the side plate 40, the contact 46 contacts with the contacts 47 and 48 to electrically connect the contacts 47 and 48. When the spool 160 (or 164) is urged leftwards to separate from the side plate 40, the contact 47 is electrically separated from the contact 48. Consequently, the shift information corresponding to the actuation of the shift valve can be obtained as ON/OFF signal from the lead wires 50 and 51 as in the above mentioned embodiment.

Figure 8:
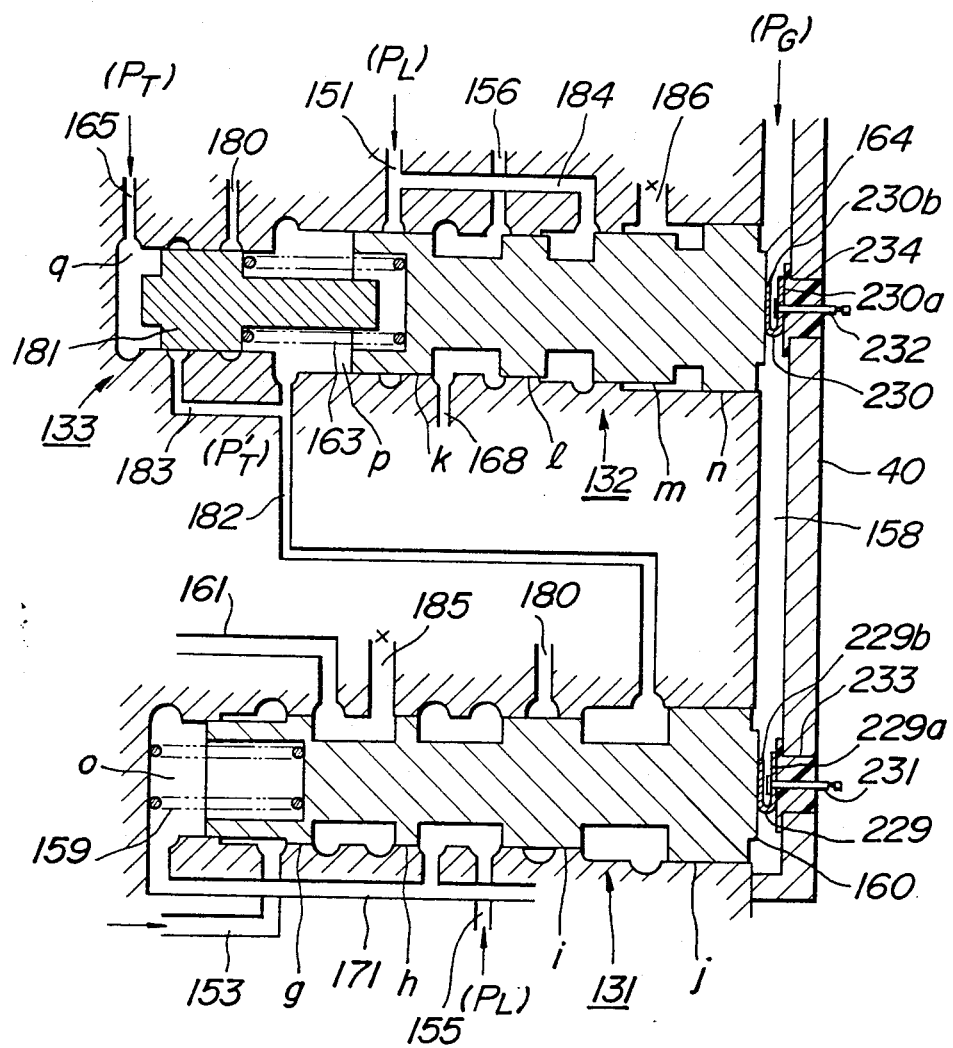
FIG. 8 is a sectional view of 1-2 shift valve and 2-3 shift valve of the automaic transmission incorporating the actuation detecting means according to the present invention.

FIG. 8 shows a further embodiment of the shift valve actuation detecting means. In this embodiment, the valve spool 160 and 164 of the 1-2 shift valve 131 and the 2-3 shift valve 132 are utilized as movable contacts, and fixed contacts 229 and 230 each opposed to the movable contact is mounted on the side plate 40 in the governor pressure passage 156 in opposition to the end surfaces of the valve spool 160 and 164. Each of the fixed contacts 229 and 230 is formed as U-shaped plate spring and one of the legs 229a and 230a, together with each of the terminals 231 and 232, is secured to each of the insulation plugs 233 and 234 which are intersected into the side plate 40. Thus, the fixed contacts 229 and 230 are mounted on, and insulated from the side plate 40.

The U-shaped contacts 229 and 230 assume in their free state the shape shown in FIGS. 9A and 9B, and the other legs 229b and 230b deform and move between the positions shown in FIG. 8 and FIGS. 9A and 9B. That is, while the valve spools 160 and 164 are moved between the right end positions shown in FIG. 8 and snap action starting positions (shift starting positions) shown in FIGS. 9A and 9B, the legs 229b and 230b of the fixed contacts 229 and 230 deform continuously while being maintained in contact with the valve spools 160 and 164.

Figure 10B:
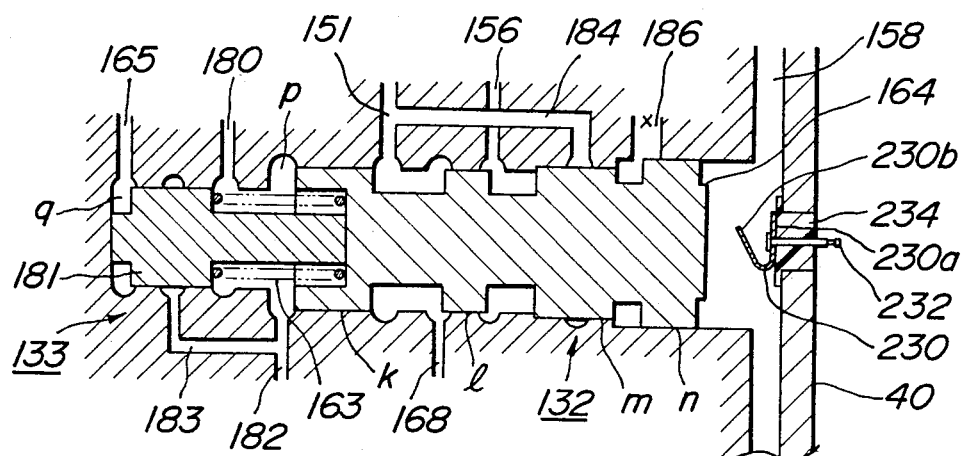
FIGS. 10A and 10B are sectional views of the 1-2 shift valve and the 2-3 shift valve in the upshift condition respectively.
Figure 10A:
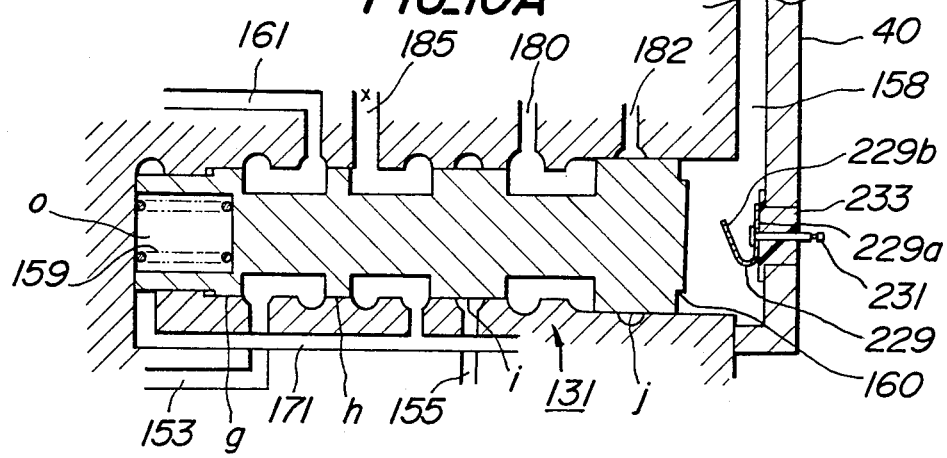

When the valve spools 160 and 164 move between the snap action starting position shown in FIGS. 9A and 9B and left end position shown in FIGS. 10A and 10B, the legs 229b and 230b can not follow the valve spools 160 and 164, and are separated from the valve spools 160 and 164 and are maintained in the free state shown in FIGS. 9A and 9B.

The above-mentioned shift detecting apparatus according to the present invention is constituted by 1-2 shift switch comprising the valve spool 160 and the fixed contact 229, and 2-3 shift switch comprising the valve spool 164 and the fixed contact 230. The valve spools 160 and 164 are connected with ground and the terminals 231 and 232 are connected with electric power source. Thus, shifting is detected in the manner described below.

When the first speed is selected, the valve spools 160 and 164 are between the positions shown in FIG. 8 and FIGS. 9A and 9B, and contact with the fixed contacts 229 and 230. Thus, the first speed is detected by the 1-2 shift switch and 2-3 shift switch both being ON. As upshifting into the second speed takes place, the valve spool 160 instantaneously moves to the position shown in FIG. 10A by a snap action from the position shown in FIG. 9A. Thus, the valve spool 160 is separated from the fixed contact 229 and 1-2 shift switch switches into OFF, so that the upshifting from the first speed to the second speed can be detected. Further, as upshifting into the third speed is performed by instantaneous movement of the valve spool 164 by the snap action from the position shown in FIG. 9B to the position shown in FIG. 10B, the valve spool 164 is separated from the fixed contact 230 so that 2-3 shift switch switches into OFF. Thus, upshifting to the third speed from the second speed can be detected.

When a downshifting takes place from the third speed to the second speed, the valve spool 164 moves instantaneously by the snap action from the position shown in FIG. 9B to the position shown in FIG. 8 and contacts with the fixed contact 230 so that the 2-3 shift switch switches into ON. Thus, downshifting from the third speed to the second speed can be detected. During the downshifting from the second speed to the first speed, the valve spool 160 moves instantaneously by the snap action from the position shown in FIG. 9A to the position shown in FIG. 8, and contacts with the fixed contact 229, so that the 1-2 shift switch is switched into ON. Thus, downshifting from the second speed to the first speed is detected.

With the above-described shift detecting apparatus according to the present invention which is used to detect each shifting, relative positions between the valve spools 160 and 164 and the fixed contacts 229 and 230 are determined such that actual switchings of the shift switches do not occur until the valve spools 160 and 164 move to actual shift positions i.e. from the positions shown in FIG. 8 or FIGS. 10A and 10B to the positions shown in FIGS. 9A and 9B, and that actual switching into the contact position or separated position of the valve spools 160 and 164 with or from the fixed contacts 229 and 230 occur only when the valve spools reach the snap action starting positions shown in FIGS. 9A and 9B. Thus, small movements of the valve spool due to fluctuations of the line pressure or governor pressure are not detected, and output timing of the shift signal substantially accurately coincides with the actual shift timing, so that reliability of the shift signal can be improved.

In the above-mentioned embodiment, U-shaped plate spring is used as the fixed contact. However, other desired contacts can be used, i.e. a hard switch having a projected actuating element biased by a spring, which is used in a door switch, etc. In this case, the valve spools 160 and 164 need not be utilized as movable contact, and the projected actuating element is operated by the valve spool to open or close another contact. Thus, electric circuit also can be simplified.

In an automatic transmission including a lock-up apparatus, generally, a direct clutch is engaged when the shift position is for the forward third speed and the vehicle speed is more than a predetermined value, to eliminate torque converter slip and to improve the fuel consumption. Conventionally, the direct clutch is controlled hydraulically so that such a direct clutch control depends on the main shift position control and, as mentioned above, the direct clutch is engaged only in the third speed range. Thus, a sufficient improvement in the fuel consumption can not be obtained. Also, when the vehicle is running at a high speed in the second speed range, the direct clutch is engaged simultaneously with the upshifting into the third speed accompanying a substantial shift shock.

In the automatic transmission according to the present invention, electric output signal from the above-mentioned shift valve actuation means is utilized as shift information to control the lock-up solenoid 31 of the lock-up apparatus such that when the vehicle speed is more than a predetermined value, the direct clutch is normally engaged, and the lock-up is released just before the shifting to reduce the shift shock, and to again establish the lock-up condition just after the shifting is completed. Thus, improvements in the acceleration and deceleration characteristics and also in the fuel consumption can be achieved.

FIG. 11 shows one embodiment of a lock-up solenoid control circuit to perform the above-mentioned lock-up control. In FIG. 11, $S_{1-2}$ and $S_{2-3}$ designate actuation detecting switches of the 1-2 shift valve and 2-3 shift valve, respectively, shown in FIGS. 4, 6, 7 or 8, $S_D$ is a D range switch which turns ON when the select lever is set to the D position. 60 is an electric power source, 61 is a time constant circuit formed by a resistor $R_1$ and a capacitor $C_1$, 62 is a time constant circuit formed by a resistor $R_2$ and a capacitor $C_2$, 63 is a terminal which receives a voltage signal $V_S$ corresponding to the vehicle speed, and 64 is a potentiometer which supplies a voltage corresponding to a set vehicle speed. Operation of the circuit will be described hereinafter.

When the select lever is set to the D position, the D range switch $S_D$ is turned ON, and a signal of high level "H" is supplied through a resistor $R_3$ to an AND circuit 65. When the vehicle speed increases beyond the set value, output of a comparator 66 becomes high level "H". Thus, when the automatic transmission is at the D range, and when the vehicle speed is more than the set speed, output of the AND circuit 65 is always in the high level "H" which is supplied to one of the input terminals of an AND circuit 71.

When the transmission is at the first speed range, the switches $S_{1-2}$ and $S_{2-3}$ are both ON as shown in the Table 2, so that inputs of exclusive or (EX OR) circuits 66 and 67 are at high level "H" and the outputs are at low level "L". Thus, output of an OR circuit 68 is at low level "L", and also output of monostable multivibrator 69 is kept at low level "L" so that inverted output of an inverter 70 is at high level "H" which is supplied to the other input of the AND circuit 71. As both inputs are at high level "H", output of the AND circuit 71 is at high level "H" which is amplified by an amplifier 72 and drives the lock up solenoid 31 to obtain the lock-up condition.

When the vehicle speed increases to effect upshifting of the transmission into the second speed, the switch $S_{1-2}$ turns OFF. Thus, the signal level at a terminal b of the EX OR circuit 66 instantaneously decreases to the low level "L", but the signal level at a terminal a of the circuit 66 is maintained at high level "H" for a delay time determined by the time constant circuit 61. Thus, the EX OR circuit 66 supplies pulse signal of high level "H" during the delay time, which is supplied to one terminal of the OR circuit 68 to generate pulse signal of high level "H" independently of the signal level of the other input. By this, the output signal level of the multivibrator 69 is high level "H" for a predetermined time, so that the inverted output of the inverter 70 is at low level "L" which is supplied to one input of the AND circuit 71 for the predetermined time.

Consequently, when the switch $S_{1-2}$ is turned OFF, output of the AND circuit 71 is at low level "L" for the predetermined time and then becomes high level "H" after that time. This means that the lock-up solenoid 31 is deenergized to release the lock-up only during the shifting operation.

When the vehicle speed increases further to effect upshifting into the third speed, the switch $S_{2-3}$ turns OFF. The EX OR circuit 67 generates pulse signal of high level "H" for a delay time determined by the time constant circuit 62, so that, in a manner similar to that described before, the lock-up solenoid 31 is deenergized to release the lock-up for a predetermined time during the shifting operation. Similarly, when the vehicle speed decreases to effect downshifting of the transmission, the lock-up is released during the shifting operation.

When the select lever is manually set to a position other than the D range, the D range switch $S_D$ turns OFF so that the output of the AND circuit 65 becomes low level "L" and the output of the AND circuit 71 becomes also low level "L". Thus, the lock-up solenoid 31 is deenergized and the lock-up is not effected.

FIG. 12 is a diagram showing the relation between shift characteristics curves and operation of the lock-up solenoid. Curves $SU_{1-2}$ and $SU_{2-3}$ show 1-2 upshifting and 2-3 upshifting curves, curves $SD_{3-2}$ and $SD_{2-1}$ show 3-2 downshifting and 2-1 downshifting curves, and lines $LU_{SU}$ and $LU_{SD}$ show operating conditions of the lock-up solenoid during the upshifting and downshifting, respectively. The relations shown in FIG. 12 correspond to the operation of the control circuit shown in FIG. 11.

It will be appreciated that, according to the present invention, shift signals can be obtained simultaneously with the movement of the shift valves, i.e. before the actual operation of the friction elements. The detecting signal may be utilized to control the direct clutch lock-up apparatus as described above. Thus, it is possible to lock-up the direct clutch normally in the D range and to release the lock-up only during the actual shifting operations, so that lock-up can be realized all through the first to third speed ranges. Compared with a conventional automatic transmission without lock-up apparatus, or with an automatic transmission which performs lock up in the third speed range only, acceleration and deceleration characteristics and fuel consumption can be substantially improved.

I claim:

1. An automatic transmission including at least one shift valve having a spool which is applied with hydraulic pressure representing the vehicle speed and, in opposition thereto, with hydraulic pressure representing the engine load, said shift valve being operated according to a predetermined relation between the vehicle speed and the engine load to selectively supply hydraulic pressure to a plurality of friction elements to engage and disengage said friction elements selectively, said shift valve having a snap action starting position between the two end positions of the spool, in which snap action starting position and the pressure receiving area of the spool changes abruptly and the spool starts displacement into one of said end positions, said transmission further including shift valve operation detecting switch means which is directly responsive to the displacement of said spool into one of said end positions, to detect said displacement and produce an electric output signal representing the operation of the shift valve, said detecting switch means including a movable contact element formed by or operated by said valve spool, and a fixed contact element opposed to the movable contact element and mounted on one end wall of said shift valve, said movable contact element being engageable or disengageable with or from said fixed contact element, said fixed contact element including a resilient element which is mounted at one end thereof on said end wall of the shift valve, said movable contact element being kept engaged or disengaged with or from the fixed contact element before said valve spool reaches said snap action starting position, and being kept disengaged or engaged from or with the fixed contact element after said valve spool displaces beyond said snap action starting position.

2. A transmission as claimed in claim 1, wherein the movalbe contact element is formed by said valve spool, said resilient element being a substantially U-shaped plate spring with its one end mounted on the inside surface of said end wall and the other end engageable with or disengagable from said valve spool.

3. An automatic transmission, comprising:
   (a) a plurality of friction elements for establishing selected gear ratios in the transmission;
   (b) at least one shift valve operatively coupled to said friction elements;
   (c) said shift valve having a spool to which is applied a hydraulic pressure representing speed and an opposing hydraulic pressure representing engine load, whereby said shift valve is operated according to a predetermined relationship between vehicle speed and engine load to selectively supply hydraulic pressure to the friction elements to selectively engage and disengage the friction elements, said shift valve having a pressure receiving area, said spool having two end positions in said shift valve, said spool being movable into and out of said end positions, said shift valve including means for effecting a snap action displacement of said spool into one of said end positions, said snap action displacement being initiated when said spool is in a snap action starting position, said snap action effecting means including means for effecting an abrupt change in said pressure receiving area of said spool;

(d) means for detecting the positions of said spools in said shift valves and generating signals in response thereto, said position detecting means including a movable contact associated with and movable with said spool and a fixed contact opposed to said movable contact and mounted at one end of said shift valve, said fixed contact including a resilient element, said movable contact being selectively engageable with said fixed contact and to establish a condition of disengagement therewith, said shift valve position detecting switch means including (i) means for generating a first signal when said spools are in the proximities of said end positions in response to one of said conditions of said fixed and movable contacts, and (ii) means for generating a second signal after said valve spool displaces beyond said snap action starting position in response to the other of said conditions of said fixed and movable contacts, whereby said shift valve position detecting switch means indicates the shift position of said transmission without the influence of small movements of the spool due to pressure fluctuations.

4. A transmission as claimed in claim 3, wherein said resilient element is a substantially U-shaped plate spring.

* * * * *